US012210340B2

United States Patent
Alamer et al.

(10) Patent No.: US 12,210,340 B2
(45) Date of Patent: Jan. 28, 2025

(54) METHOD FOR VIBRATION MEASUREMENT AND DIAGNOSTICS USING SINGLE VIBRATION MEASUREMENT PROBE

(71) Applicant: SAUDI ARABIAN OIL COMPANY, Dhahran (SA)

(72) Inventors: Ahmad A. Alamer, Dhahran (SA); Mohammed K. Almousa, Dhahran (SA); Hadi A. Al-Qahtani, Dhahran (SA); Abdullah O. Al-Swailem, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 394 days.

(21) Appl. No.: 17/809,418

(22) Filed: Jun. 28, 2022

(65) Prior Publication Data

US 2023/0418277 A1  Dec. 28, 2023

(51) Int. Cl.
*G05B 23/02* (2006.01)
*G01H 1/00* (2006.01)
*G01M 7/00* (2006.01)

(52) U.S. Cl.
CPC ....... *G05B 23/0243* (2013.01); *G05B 23/024* (2013.01); *G05B 23/0283* (2013.01); *G05B 23/0286* (2013.01); *G01H 1/003* (2013.01); *G01M 7/00* (2013.01)

(58) Field of Classification Search
USPC .......................................................... 702/56
See application file for complete search history.

(56) References Cited

U.S. PATENT DOCUMENTS

| 7,787,969 B2 | 8/2010 | Grichnik et al. |
| 8,793,004 B2 | 7/2014 | Grichnik et al. |
| 11,740,122 B2 * | 8/2023 | Liu ........................ G01H 17/00 702/56 |

(Continued)

FOREIGN PATENT DOCUMENTS

CN 107798298 A 3/2018

OTHER PUBLICATIONS

First Examination Report issued in Saudi Arabia Application No. 123447357, dated Apr. 24, 2024 (9 pages).

(Continued)

*Primary Examiner* — Paul D Lee
(74) *Attorney, Agent, or Firm* — Osha Bergman Watanabe & Burton LLP

(57) ABSTRACT

A method which includes receiving a first signal from a first probe at a first location monitoring a rotating component, wherein the first location defines a cross-sectional plane that is perpendicular to the axis of rotation of the rotating component. The method further includes obtaining a vibration model and generating, by a computer processor, a virtual signal at a second location on the machine, where no second probe is present. The second location is in the same cross-sectional plane as the first location and is angularly offset by an angle from the first location. The method further includes performing a plurality of signal processing techniques based, at least in part, on the first signal and the virtual signal and transmitting a plurality of commands based, at least in part, on results of the plurality of signal processing techniques.

20 Claims, 10 Drawing Sheets

(56) References Cited

U.S. PATENT DOCUMENTS

| | | | |
|---|---|---|---|
| 12,019,052 B2* | 6/2024 | Nair | G01M 13/028 |
| 2003/0158694 A1 | 8/2003 | Wegerich | |
| 2005/0209814 A1* | 9/2005 | Song | G01P 3/44 |
| | | | 702/145 |
| 2005/0246150 A1* | 11/2005 | Shiromaru | G01M 13/045 |
| | | | 703/7 |
| 2009/0119065 A1 | 5/2009 | Grichnik et al. | |
| 2017/0261347 A1* | 9/2017 | Nagata | G01D 5/165 |
| 2019/0121342 A1 | 4/2019 | Cella et al. | |
| 2022/0128620 A1* | 4/2022 | Nair | G05B 23/0254 |

OTHER PUBLICATIONS

Sun, Shan-Bin, et al., "A Data-Driven Response Virtual Sensor Technique with Partial Vibration Measurements Using Convolutional Neural Network", Sensors, MDPI, vol. 17, No. 2888, 2017, pp. 1-22 (22 pages).

\* cited by examiner

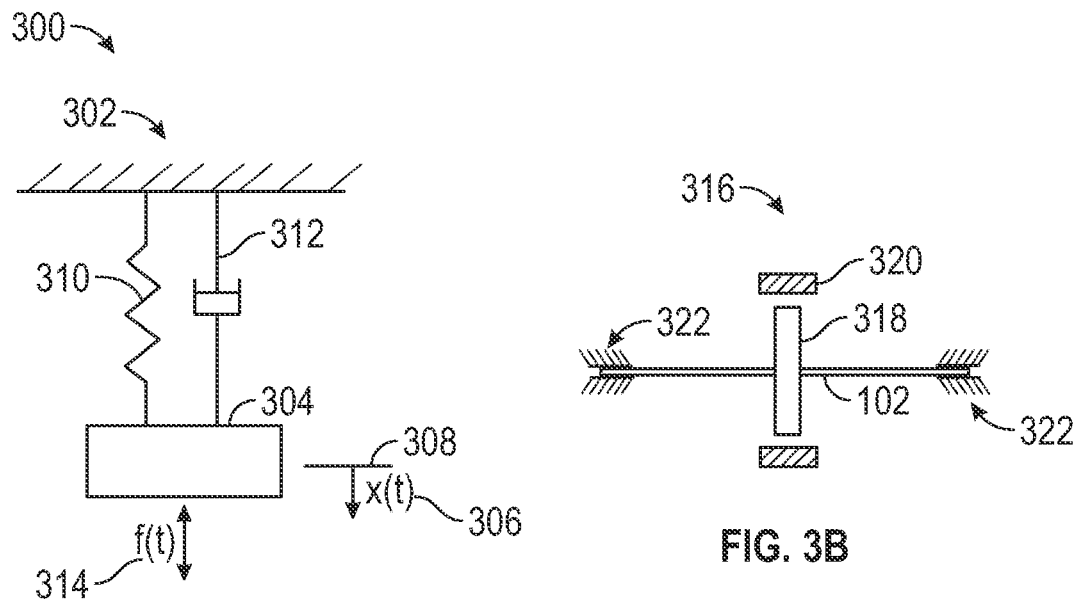
FIG. 3A
FIG. 3B
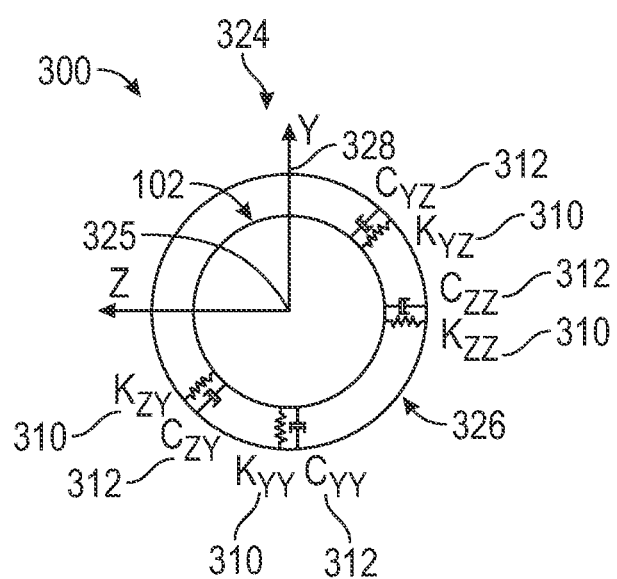
FIG. 3C

METHOD FOR VIBRATION MEASUREMENT AND DIAGNOSTICS USING SINGLE VIBRATION MEASUREMENT PROBE

BACKGROUND

Equipment and machinery, and particularly those with rotation components, may produce and/or experience vibrations. Probes may be used at various locations on equipment or machinery to monitor the vibrations. The vibration signals from the probes may be used to monitor the health of the equipment, detect component failures, and identify areas where preventative maintenance may be taken. Some vibration analysis techniques require at least two probes to generate vibration information such as phase angle, shaft orbit, bode plot, etc. The typical two probe system consists of two measurement devices usually called X and Y interchangeably. They are located on the same cross-sectional plane with respect to the measured location and they are usually angularly separated by 60 to 120 degrees. In some instances, due to physical or economical constraints, it is not possible to insert and use two or more probes on a machine. In other words, in cases where only one probe may be used, potential vibration analysis techniques are limited.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One or more embodiments disclosed herein generally relate to a method which includes receiving a first signal from a first probe at a first location monitoring a rotating component, wherein the first location defines a cross-sectional plane that is perpendicular to the axis of rotation of the rotating component. The method further includes obtaining a vibration model and generating, by a computer processor, a virtual signal at a second location on the machine, where no second probe is present. The second location is in the same cross-sectional plane as the first location and is angularly offset by an angle from the first location. The method further includes performing a plurality of signal processing techniques based, at least in part, on the first signal and the virtual signal and transmitting a plurality of commands based, at least in part, on results of the plurality of signal processing techniques.

One or more embodiments disclosed herein generally relate to methods and systems to generate a virtual signal. The system having instructions executable by a computer processor. The instructions including functionality for receiving a first signal from a first probe at a first location monitoring a rotating component, wherein the first location lies in a cross-sectional plane that is perpendicular to the axis of rotation of the rotating component. The instructions further including functionality for obtaining a vibration model and generating a virtual signal at a second location using the vibration model wherein the second location lies in the same cross-sectional plane as the first location. The second location is angularly offset by an angle from the first location. The instructions further including functionality for performing a plurality of signal processing techniques based, at least in part, on the first signal and the virtual signal. The instructions further include functionality for transmitting a plurality of commands to adjust the operation of the rotating component based, at least in part, on the results of the plurality of signal processing techniques.

One or more embodiments disclosed herein generally relate to a system. The system includes a machine and a first vibration probe at a first location disposed to monitor, at least, a rotating component of the machine. The first location defines a cross-sectional plane perpendicular to the axis of rotation of the rotating component. The system further includes a vibration model. The system further includes a computer communicably connected to the first vibration probe. The computer includes one or more computer processors and a non-transitory computer readable medium storing instructions executable by a computer processor. The instructions include functionality for receiving a first signal from the first vibration probe and generating a virtual signal at a second location on the machine, wherein the second location lies in the cross-sectional plane and is angularly offset by an angle from the first location. The instructions further include functionality for performing a plurality of signal processing techniques based, at least in part, on the first signal and the virtual signal. The instructions further include functionality for transmitting a plurality of commands to adjust the machine based, at least in part, on the results of the plurality of signal processing techniques.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3A-C illustrates physical system models, in accordance with one or more embodiments.

DETAILED DESCRIPTION

Figure 1:
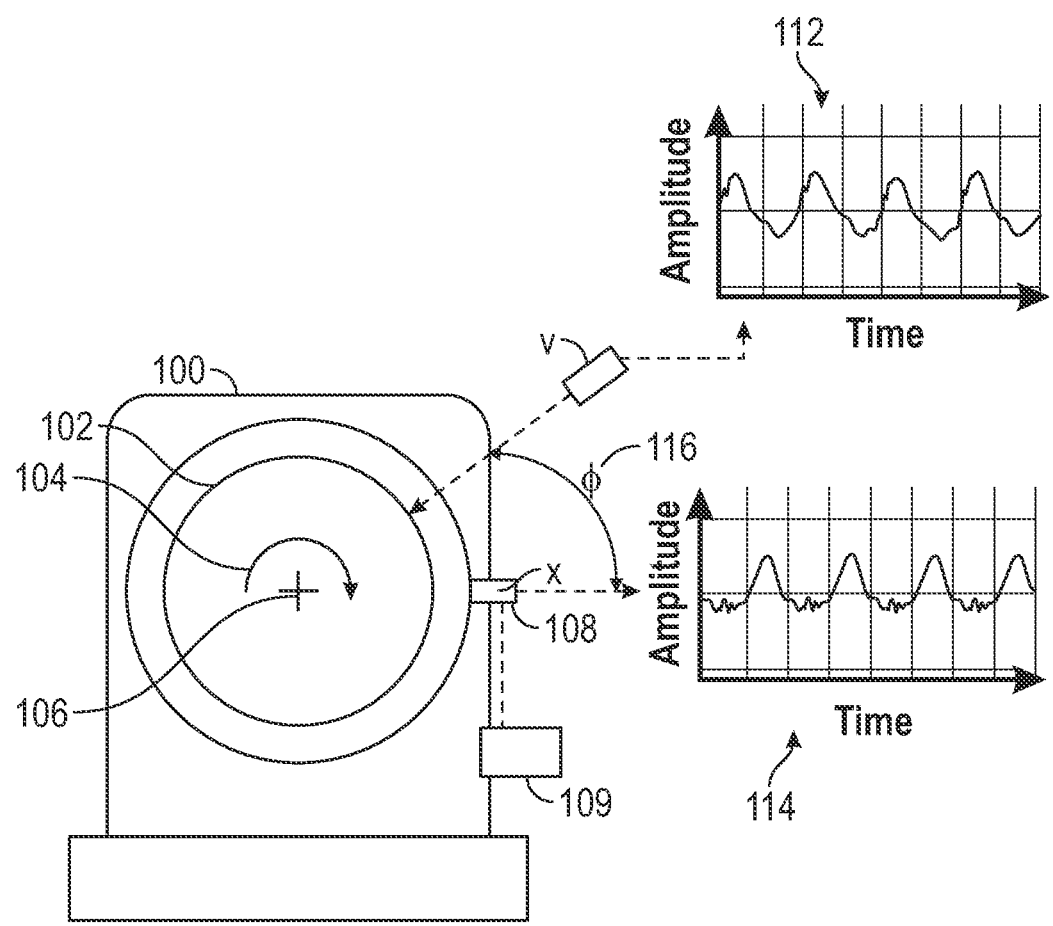
FIG. 1 depicts a machine with rotating components, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Equipment and machinery may produce and/or be subjected to vibrations. For example, machines such as pumps, fans, turbines, and compressors contain rotating components that cause vibrations. Plants or operating facilities using these machines may experience unscheduled upsets, downtime, or loss of performance with machine faults. It is generally beneficial to an operating facility to run machines for longer periods of time and reduce the amount of time that machines are out of use. Additionally, unexpected outages, which may cause a facility to reduce or stop production output, bear a high economic cost.

In general, to mitigate operational upsets and improve facility reliability and performance, machines at an operating facility are monitored and evaluated. Monitoring may be done with sensors or probes designed to measure physical quantities such as temperature or position. The probes may be embedded into the machines or may be external to the machines. By monitoring the machines, the health status of a machine may be evaluated, the root cause of issues may be determined, and potential failure modes may be predicted. Predictive capability in an operating facility helps operators identify which equipment is most vulnerable to failure and take preventative actions to reduce outages. In addition, strategically employed preventative maintenance increases the longevity and individual output of machines improving the production efficiency of an operational facility.

Embodiments disclosed herein present a method for using a single vibration measurement probe to generate a second "virtual" probe using numerical calculations and machine learning techniques. The invention in this disclosure generates similar or better vibration information from the signal of only one physical probe to compute the second "virtual" probe using numerical methods, inferential methods, and machine learning techniques.

FIG. 1 depicts a simplified example of a machine (100). The machine (100) of FIG. 1 contains a shaft (102) which rotates (104) about the shaft center (106). This machine (100) produces vibrations. A vibration probe (108) is attached to the machine (100). Many types of vibration probes (108) exist, but generally a vibration probe (108) measures the displacement (x), velocity ($\dot{x}$), or acceleration ($\ddot{x}$) of a component of a machine (100) or the machine (100) itself in time. That is, a vibration probe (108) produces a time-series representing the displacement (x), velocity ($\dot{x}$), or acceleration ($\ddot{x}$) of an object at a sequence of discrete sample times. Additionally, vibration probes (108) may include a speed sensor or tachometer, however, a speed sensor or tachometer is not a strict requirement. As an example, one type of vibration probe (108) is an Eddy-current sensor. Eddy-current sensors are non-contact sensors which generate a magnetic field and measure the relative displacement (x) of an object. Other vibration probes (108) may include, but are not limited to: strain gauges; gyroscopes; accelerometers; and microphones.

FIG. 1 illustrates one vibration probe (108) attached to the simple machine (100); namely, a first probe (X). If a second vibration probe (108) were attached to the machine (100) it would be referenced as a second probe (Y). In the example of FIG. 1, the first probe (X) is situated to measure the vibrations (through displacement (x), velocity ($\dot{x}$), or acceleration ($\ddot{x}$) of the shaft (102). Typically, in the case of a first probe (X) and a second probe (Y), the first probe (X) and the second probe (Y) are located on the same cross-sectional plane of the machine (100) but are angularly offset by an angle $\theta$. The angle $\theta$ is usually between 60 and 180 degrees. Vibration probes (108) are accompanied by control equipment (109). The control equipment (109) may include additional instruments, cables, junction boxes, power supplies, communication and data interfaces, networking capabilities, and control modules.

As previously stated, a vibration probe (108) produces a time-series signal. As illustrated in FIG. 1, the first probe (X) outputs a first signal (114) representing the measured time-history and strength of the vibrations (displacement (x), velocity ($\dot{x}$), or acceleration ($\ddot{x}$)) of the shaft (102) proximate the location of the first probe (X).

One with ordinary skill in the art will appreciate that the machine (100) and vibration probes (108) as shown in FIG. 1 may be configured in a variety of ways according to the specific needs of an operating facility or plant. For example, the machine (100) need not include rotating components to produce or be subject to vibrations. As such, the machine (100) and arrangement of vibration probes (108) as shown in FIG. 1 are non-limiting.

The signal of a vibration probe (108), or the signals of many vibration probes (108), may be processed and analyzed, independently or together, to further represent the state, condition, or properties of a machine (100). Analyses and methods to transform vibration probe (108) signals to useful information are herein described as signal processing techniques. Signal processing techniques may include, but are not limited to: the application of a Fourier transform to convert the signal from the time-domain to the frequency-domain; time- or frequency-based signal filtering; autoregressive averages; and high-order statistics. Some signal processing techniques require two or more vibration probe (108) signals.

Figure 2A:
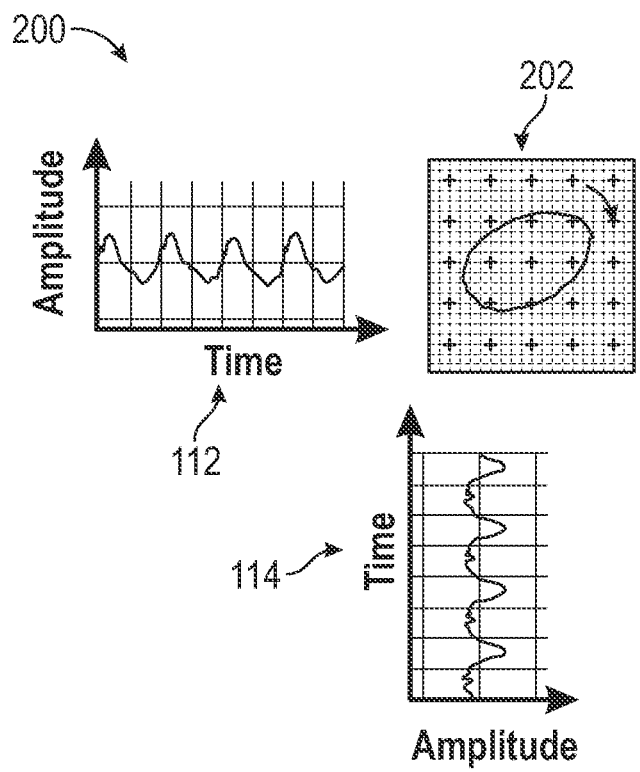
FIGS. 2A-C shows various vibration analysis plots, in accordance with one or more embodiments.
Figure 2B:
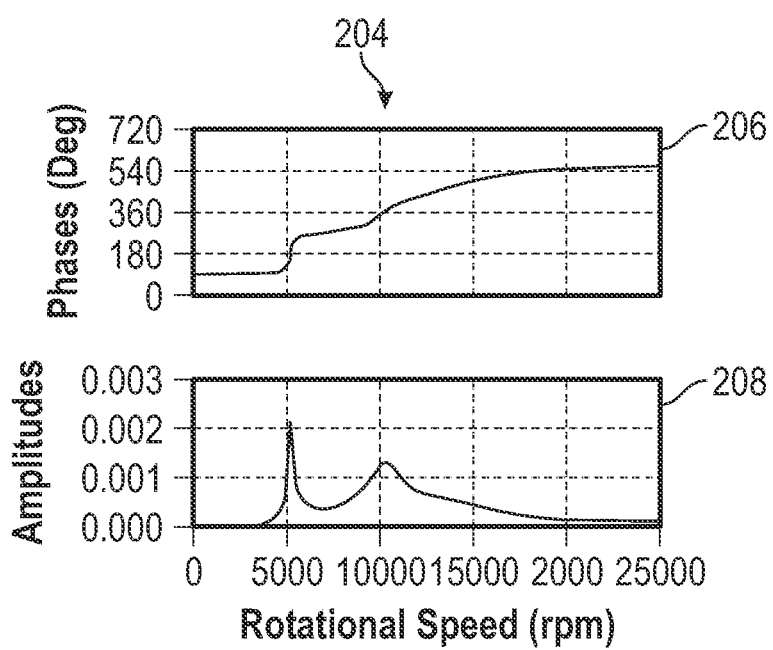
Figure 2C:
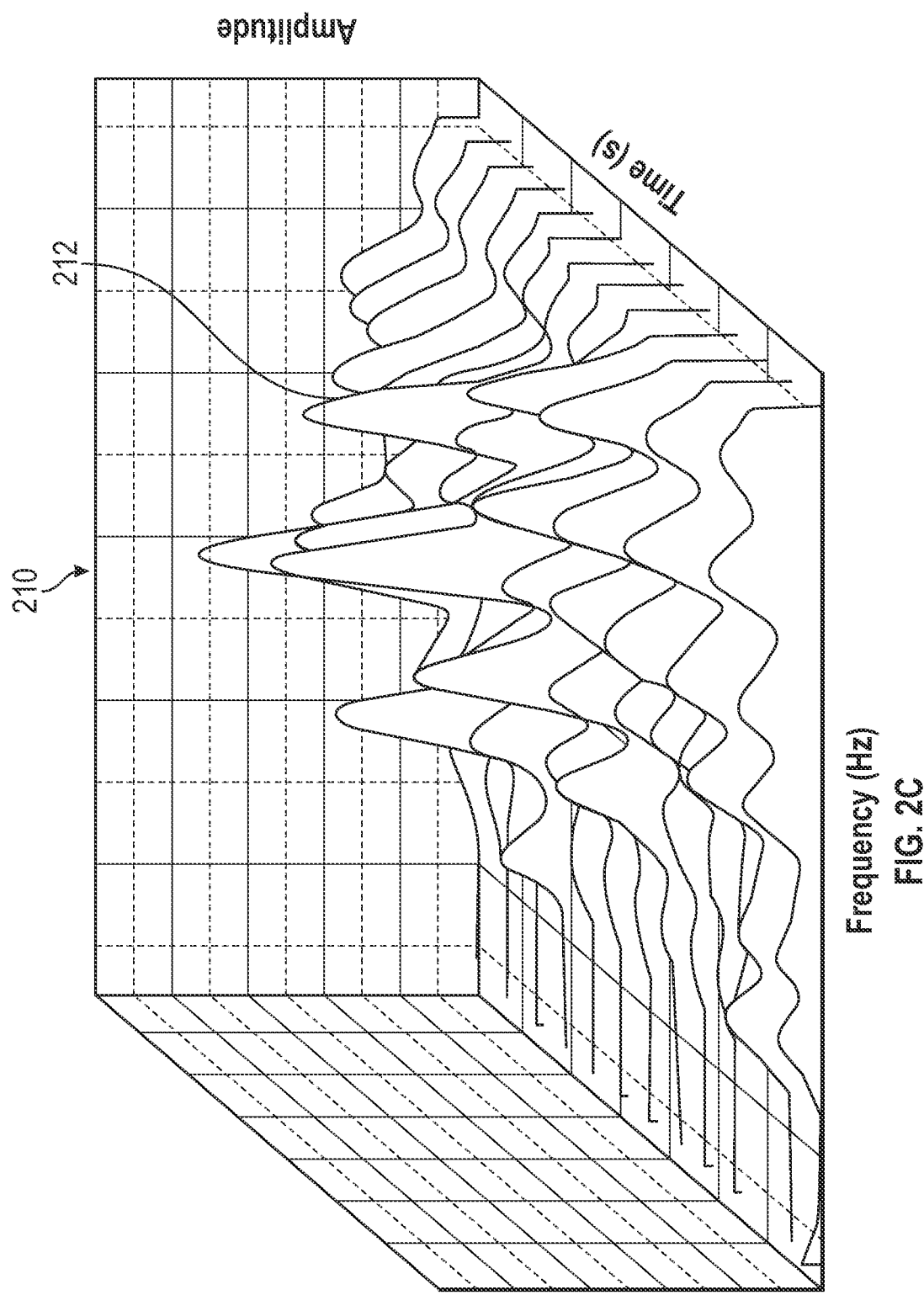

Often, the result of signal processing techniques may be displayed graphically. FIGS. 2A-2C demonstrate plots that may be constructed to display information acquired through the analysis of vibration probe (108) signals. Specifically, FIG. 2A depicts an orbit plot (202). As illustrated, an orbit plot (202) is constructed by simultaneously plotting the signals from two vibration probes (108) disposed at different locations on a machine on orthogonal axes; for example, signals from a first probe (X) and a second probe (Y). Note, that if the offset angle $\theta$ (110) between the first probe (X) and the second probe (Y) is not 90 degrees ($\pi/4$ radians), additional processing is required to form an orbit plot (202). An orbit plot (202) provides a graphical representation of shaft (102) motion. An orbit plot (202) may be used to detect excessive shaft (102) movement and indicate when a shaft (102) may contact and damage other components of the machine (100). Generally, perturbations or malfunctions in machinery with rotating shafts may be detected through evaluation of an orbit plot (202). Additionally, orbit plot (202) shape is related to machine (100) health and condition.

FIG. 2B demonstrates a Bode plot (204). A Bode plot (204) displays the phase response (206) and amplitude response (208) of a vibration probe (108) signal as a function of the shaft (102) rotational speed. The Bode plot (204) is particularly useful for evaluating machine (100) behavior and health during transient periods; such as the startup and shut-down of a machine (100). A Bode plot (204) may be displayed as a polar plot (not shown) wherein the Bode plot (204) data is presented in a Nyquist format. Bode plots (204) may also be useful in identifying critical or resonant rotational speeds of a shaft (102).

FIG. 2C depicts a waterfall plot (210). A waterfall plot (210) may also be referenced as a cascade plot or a spectrogram in the literature. A waterfall plot (210) may plot the frequency spectra (212) of a vibration probe (108) signal as a function of time. A vibration probe (108) signal may be decomposed into a plurality of individual signals — each with an associated frequency. The frequency spectra (212) represent the strength of decomposed single-frequency signals. Again, the frequency spectra may (212) be evaluated to determine the health of a machine (100) or the condition and state of components of a machine (100). For example, an abrupt change in the frequency spectra (212) in time may indicate a damaged component, such as a bearing.

Many signal processing techniques exist, and there are many ways to graphically display information acquired through a signal processing technique. As such, it is emphasized that the graphical representations and associated signal processing techniques shown in FIGS. 2A-2C are provided as an example and are not all-inclusive. Additional signal processing techniques and graphical displays may include: shaft (102) vibration phase angle; shaft (102) wave form; shaft center (104) location plot; and frequency spectrum analysis for vibration probes (108).

One with ordinary skill in the art will appreciate that the fact that not all signal processing techniques and graphical representations are enumerated herein does not limit the scope of the present disclosure. Because signal processing techniques transform one or more vibration probe (108) signals into useful information regarding the state, condition, and health of a machine (100), the results of signal processing techniques may be evaluated to determine the best course of action for a machine (100), or machinery, of an operating facility. For example, upon evaluation of a waterfall plot (210) it may be determined that a component of a machine (100) has sustained wear and is nearing failure. Consequently, an action to replace the component of the machine (100) may be scheduled. By identifying and predicting which machine (100), or components of machines (100), are faulty or nearing failure, preventative actions may be performed to promote optimal production in an operating facility and mitigate against unscheduled upsets and downtime.

In some instances, the vibrations of a machine (100) may be modeled by a physical system model (300). As an example, FIG. 3A depicts an idealized one degree of freedom (1-dof) system (302). The 1-dof system (302) is a discretized model of a dynamic system and relates the movement of a mass to external forces. The dynamic system is modeled using a lumped single point mass (304). The position of the mass at any instance in time is denoted by x(t) (306), where the position is measured relative to a datum (308). The stored, or internal, energy of the dynamic system is modeled as a spring (310) which has an associated spring stiffness, k. Energy is dissipated from the dynamic system through a damper (312) wherein the damping strength is indicated by a damping coefficient, C. For example, a viscous damper (312) may represent the dissipation of energy outside of the dynamic system as heat. The dynamic system may be subjected to a time-dependent external force represented as a forcing function, $f(t)$ (314). Physical systems of greater complexity, or higher degrees of freedom, may be represented by physical system models (300) with many springs (310), dampers (312), and masses (304). Complex physical system models (300) may be constructed through a combination and arrangement of many 1-dof systems (302).

The 1-dof system (302) of FIG. 3A may be mathematically modeled as $$m\ddot{x}+C\dot{x}+kx=f(t), \quad (1)$$

where m is the mass (304) of the system, C is the damper (312) coefficient, k is the spring (310) stiffness, $f(t)$ is the forcing function (314), and $\ddot{x}$, $\dot{x}$, and x are the instantaneous acceleration, velocity, and displacement of the mass (304), respectively, relative to a datum (308). As previously stated, vibration probes (108) measure displacement (x), velocity ($\dot{x}$), or acceleration ($\ddot{x}$). In general, measurement of any one of displacement (x), velocity ($\dot{x}$), or acceleration ($\ddot{x}$) is sufficient to determine the remaining two through application of a derivative and/or an integral. For example, given displacement (x), velocity ($\dot{x}$) and acceleration ($\ddot{x}$) may be determined. As such, a vibration probe (108) provides a lot of information with respect to the mathematical model of a dynamic system. It is noted that some caveats may apply when converting between displacement (x), velocity ($\dot{x}$) and acceleration ($\ddot{x}$); the signals may require pre-processing and/or smoothing, and depending on the frequencies present in the signal, a minimum sampling rate may be required.

FIG. 3B depicts another simplified viewpoint of a machine (100). Here, a rotating shaft (102) contains a disc (318) with an associated mass, m. The disc is circumvented by a stator (320). The shaft (102) is supported by fluid-film bearings (322) on the ends of the shaft (322). The fluid-film bearing end-supported shaft (316) may be described with a physical system model (300). FIG. 3C shows the two degree of freedom (2-dof) system (324) which describes the machine (100) of FIG. 3B. FIG. 3C is a cross-section of the simple machine (100) of FIG. 3B proximate one of the fluid-filled bearings (322). As shown, the shaft (102) is supported within the bearing housing (326). The two degrees of freedom of this physical system model (300) are defined by a coordinate system with Y axis and a Z axis (325). Like the physical system model (300) of FIG. 3A, various springs (310) and dampers (312) are used to model stored energy and dissipated energy, respectively, of the dynamic system.

The 2-dof system (324) of FIG. 3C may be mathematically modeled with the following equations:

$$m\ddot{y}+C\dot{y}+ky=F_y+F_{by}+mu_{im}\omega^2\cos(\omega t)-mg$$

$$m\ddot{z}+C\dot{z}+kz=F_z+F_{bz}+mu_{im}\omega^2\sin(\omega t). \quad (2)$$

In the above equations, ω is the angular speed of the shaft (102), k is the shaft stiffness, C is the shaft damping coefficient, $u_{im}$ is the unbalance eccentricity, and g is the acceleration due to gravity. $\ddot{y}$, $\dot{y}$, and y are the instantaneous acceleration, velocity, and displacement, respectively, relative to the Y axis. Likewise, $\ddot{z}$, $\dot{z}$, and z are the instantaneous acceleration, velocity, and displacement, respectively, relative to the Z axis. $F_y$ and $F_z$ are rubbing forces generated due to the interaction of the disc (318) and stator (320). Expressions for $F_y$ and $F_z$ may be derived with simplifying assumptions, however, they are omitted here for brevity. $F_{by}$ and $F_{bz}$ are bearing reaction forces and are given as $$\begin{bmatrix} F_{by} \\ F_{bz} \end{bmatrix} = \begin{bmatrix} k_{yy} & k_{yz} \\ k_{zy} & k_{zz} \end{bmatrix} \begin{bmatrix} y \\ z \end{bmatrix} - \begin{bmatrix} C_{yy} & C_{yz} \\ C_{zy} & C_{zz} \end{bmatrix} \begin{bmatrix} \dot{y} \\ \dot{z} \end{bmatrix} \quad (3)$$

where the spring (310) stiffnesses and damping coefficients are shown in FIG. 3C.

On some machines (100), due to physical or economical constraints, it is only possible to use a single vibration probe (108). For example, the construction of the machine (100) or its placement within an operating facility may deny access to a vibration probe (108). In other instances, the machine (100) may not have physical space available for a vibration probe (108) and/or the associated control equipment (109). Further, the cost of additional vibration probes (108) may be burdensome limiting the monitoring of a machine (100) to a single vibration probe (108). As previously stated, some signal processing techniques require signals from two or more vibration probes (108). Consequently, in cases where a machine (100) is monitored by a single vibration probe (108), the available signal processing techniques are limited. Because signal processing techniques transform the vibration probe (108) signals into useful information which may be graphically represented and/or evaluated to determine the health, state, and condition of a machine (100), a limitation on the available signal processing techniques likewise restricts the evaluation of the machine (100).

Embodiments disclosed herein relate to a method of generating one or more virtual vibration signals from a single vibration probe (108) using machine learning (ML) and/or numerical techniques. In accordance with one or more embodiments, a machine (100) may include one or more virtual vibration measuring systems. For example, the machine (100) of FIG. 1, due to a constraint, only allows for a single vibration probe (108); a first probe (X). The first probe (X) resides at a first location on the machine (100). The first probe (X) outputs a first signal (114) representing the measured time-history and strength of the vibrations (displacement (x), velocity ($\dot{x}$), or acceleration ($\ddot{x}$)) of the shaft (102) proximate the first location. A virtual probe (V) is depicted as residing at a second location. The virtual probe (V) outputs a virtual signal (112). The virtual probe (V) is not physically present at the machine (100) and is only illustrated on FIG. 1 to promote understanding. The first location and the second location reside on the same cross-sectional plane of the machine (100) but are angularly offset by an angle φ (116). The virtual signal (112) represents the signal that would be output by a vibration probe (108) if a vibration probe (108) was present at the second location. Using the virtual signal (112) and the first signal (114), more signal processing techniques are available to analyze the vibration signals. In particular, a virtual vibration measuring system may include a control system or other computer device that acquires sensor measurements from multiple sensors (e.g. vibration probes (108)) with respect to a machine (100) or component of a machine (100). A virtual vibration measuring system, with knowledge of, at least, the first location of a first probe (X) on a machine (100), may determine the vibration signal (i.e. virtual signal (112)) at a second location, where the second location is on the same cross-sectional plane as the first probe (X) but angularly offset, without using a second probe (Y) (i.e. a physical sensor). In some embodiments, for example, a virtual vibration measuring system uses a physical system model (300) to determine a respective virtual signal (112). Examples of physical system models may include orifice those seen in FIGS. 3A and 3C, which are mathematically represented by EQs. 1 and 2-3, respectively. In some embodiments, for example, a virtual vibration measuring system uses a machine-learned model (300) to determine a respective virtual signal (112).

Figure 4:
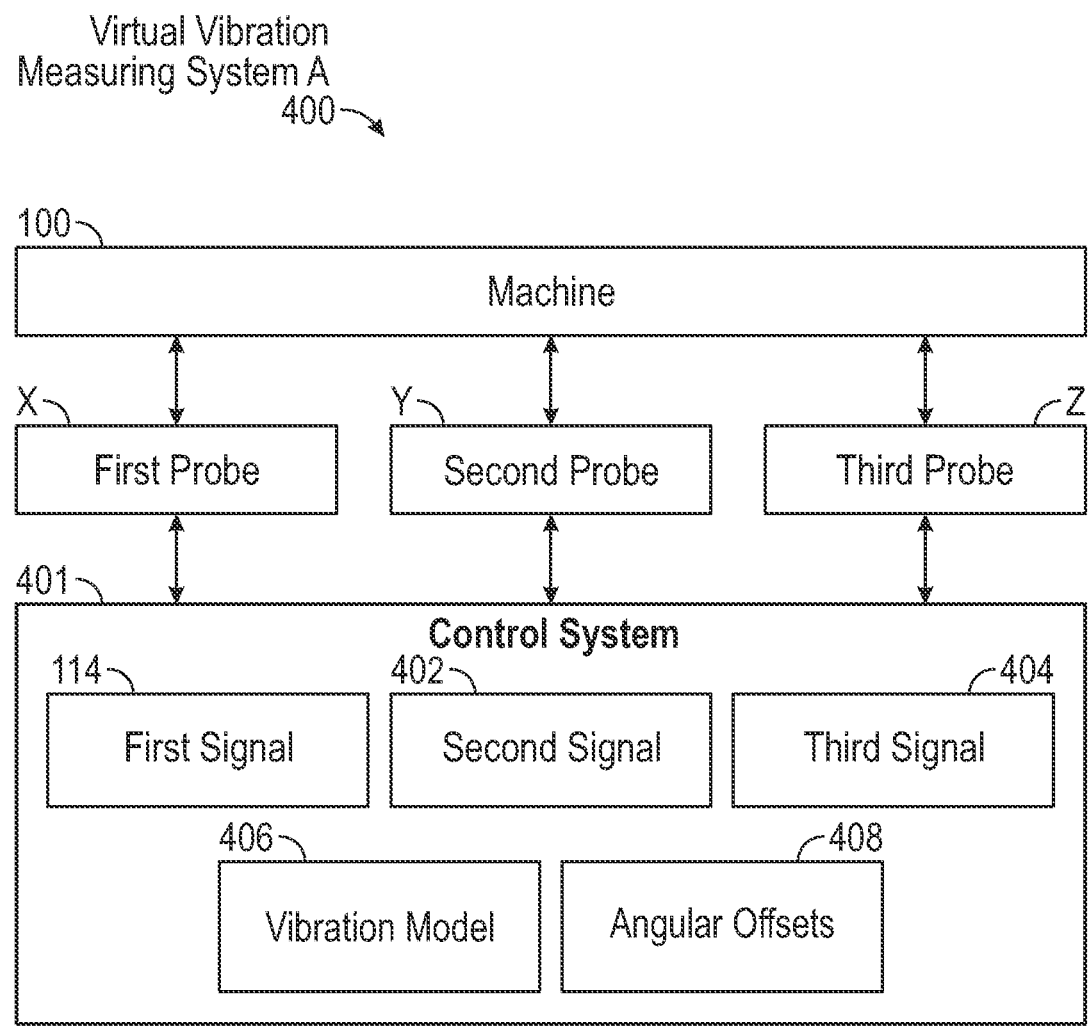
FIG. 4 depicts a system, in accordance with one or more embodiments.

Turning to FIG. 4, FIG. 4 shows a schematic diagram in accordance with one or more embodiments. As shown in FIG. 4, a virtual vibration measuring system (e.g., virtual vibration measuring system A (400)) may include a control system (402), a machine (100), one or more vibration probes (108) (e.g. a first probe (X), a second probe (Y), a third probe (Z), etc.), one or more signals received from the vibration probes (108) (e.g. a first signal (114), a second signal (402), a third signal (404)), one or more angular offsets (408), and a vibration model (406). In the case with multiple probes, as in FIG. 4, the virtual vibration measuring system A (400) allows for the generation of one or more virtual signals (V) for each physical probe (first probe (X), etc.). For example, in a machine (100) with a shaft (102), a first probe (X) and a second probe (Y) may be disposed along a shaft at two different axial locations. As such, the first probe (X) may be used, with the virtual vibration measuring system A (400) to generate a first virtual signal on the same cross-sectional plane as the first probe (X) but angularly offset by an angle φ$_X$ listed in the angular offsets (408). Likewise, the second probe (Y) may be used with the virtual vibration measuring system A (400) to generate a second virtual signal on the same cross-sectional plane as the second probe (Y) (which is at a different location along the axis of the shaft (102) than the first probe (X)) but angularly offset by an angle φ$_Y$ indicated by the angular offsets (408).

In some embodiments, a control system (401) in the virtual vibration measuring system includes a vibration model (406). The vibration model (406) may consist of a physical system model (300), a machine-learned model, or both.

Machine learning, broadly defined, is the extraction of patterns and insights from data. The phrases "artificial intelligence", "machine learning", "deep learning", "statistical learning", "fitting", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. Herein, machine learning is defined to specifically comprise techniques for determining unknown parameters in a model. Moreover, for consistency, the term machine learning, or machine-learned, will be adopted herein, however, one skilled in the art will recognize that the concepts and methods detailed hereafter are not limited by this choice of nomenclature.

Machine-learned model types that may be used in the vibration model (406) may include, but are not limited to, neural networks, random forests, generalized linear models, long short term memory (LSTM) networks, transformers, genetic algorithms, optimization methods, and Bayesian regression. Machine-learned model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. The selection of hyperparameters surrounding a model is referred to as selecting the model "architecture".

In particular, a vibration model (406) may describe one or more physical criteria or conditions for determining a virtual vibration signal. For example, the vibration model (406) may specify various boundary conditions or physical system coefficients. In some embodiments, a machine-learned model directly relating a physical signal (e.g. the first signal (114)) to a virtual signal (114) may be trained using physics-based constraints (e.g. a regularization term that penalizes divergence from a physical system model (300)). In some embodiments, as machine-learned model comprising a fitting or optimization routine may be used to estimate any unknown parameters in the physical system model (300).

With respect to control systems (401), a control system may include hardware and/or software that monitors and/or operates equipment, such as on a machine (100) or for machinery at an operations facility. In particular, a control system (401) may be coupled to facility equipment and sensors to collect data throughout a facility. For example, facility equipment may include various hardware components, such as, pumps, valves, and compressors among various other types of hardware components. Examples of sensors may include pressure sensors, temperature sensors, torque sensors, weight sensors, vibration probes, accelerometers, etc. In some embodiments, a control system (401) may include a programmable logic controller that may control the state (e.g. "on" or "off", operational speed, etc.) of one or more machines (100). In some embodiments, the control system (401) may activate warning alarms, emergency stops and/or various hardware components throughout a facility. Thus, a programmable logic controller may be a ruggedized computer system with functionality to withstand vibrations, extreme temperatures, wet conditions, and/or dusty conditions, such as those potentially found in an operational facility. Furthermore, a control system may be a computer system similar to the computer system (1002) described in FIG. 10 and the accompanying description.

In some embodiments, a control system includes a distributed control system (DCS). A distributed control system may be a computer system for managing various processes at a facility using multiple control loops. As such, a distributed control system may include various autonomous controllers (such as remote terminal units (RTUs)) positioned at different locations throughout the facility to manage operations and monitor processes. Likewise, a distributed control system may include no single centralized computer for managing control loops and other operations. With respect to an RTU, an RTU may include hardware and/or software, such as a microprocessor, that connects sensors and/or actuators using network connections to perform various processes in the automation system.

By generating one or more virtual signals from a single vibration probe (108) (or multiple vibration probes (108) at disposed on different cross-sectional planes), no limitation is placed on the available signal processing techniques and machine (100) health, condition, and state monitoring is greatly improved. Improved health, state, and condition monitoring reduces uncertainty about which course of action, if any, should be taken on a machine (100).

Figure 5:
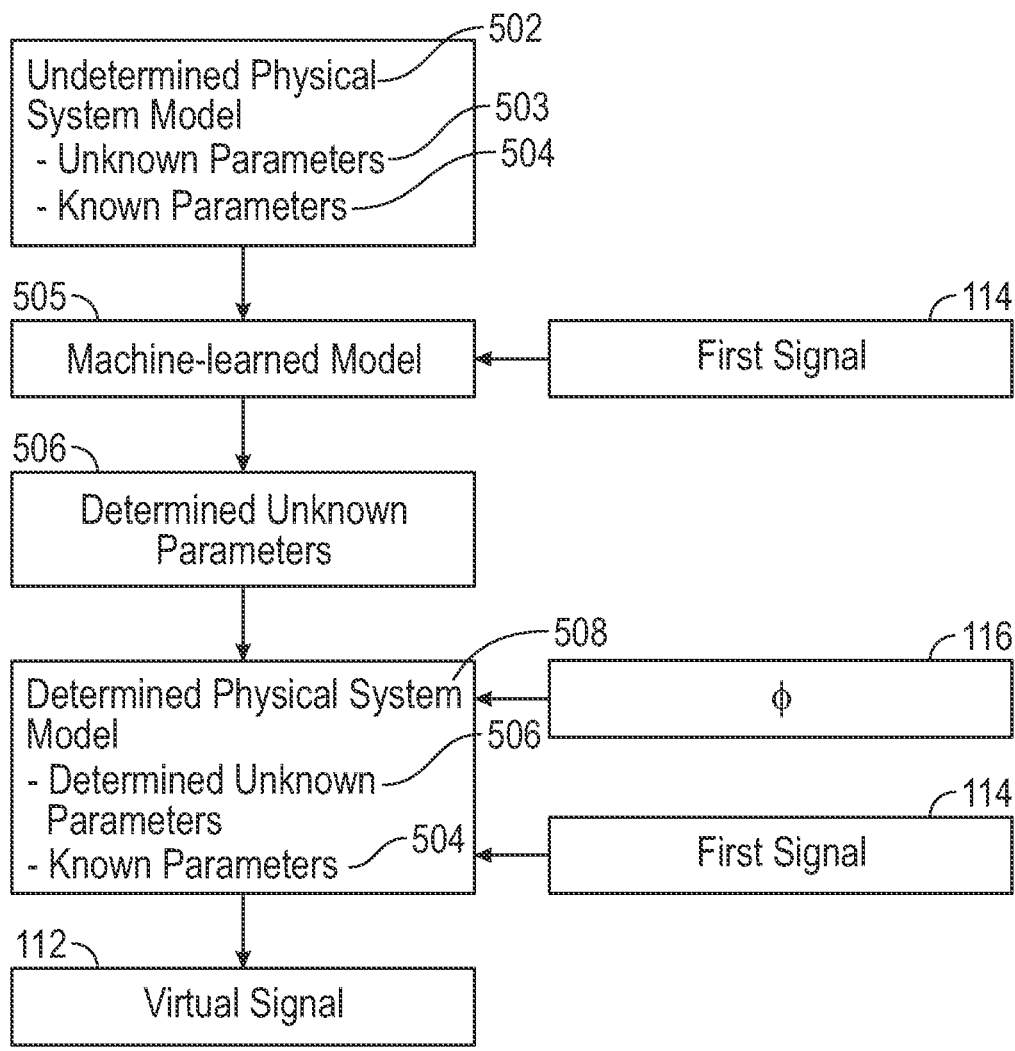
FIG. 5 depicts a process, in accordance with one or more embodiments.

In accordance with one or more embodiments, a process of generating a virtual signal (112) is shown in FIG. 5. As seen, there is an undetermined physical system model (502) which models the dynamic response of a machine (100). The physical system model (300) is said to be undetermined because not all of the parameters of the physical system model (300) are known. That is, the undetermined physical system model (502) contains known parameters (504) and unknown parameters (503). In one or more embodiments, the unknown parameters (503) may include spring (310) stiffnesses or damper (312) coefficients. A first signal (114) at a first location on the machine (100) is collected. The first signal (114), with knowledge of the undetermined physical system model (502) is processed by a machine-learned model (505) to determine the unknown parameters (503). In other words, the machine-learned model (404) outputs determined unknown parameters (506), where a value for each unknown parameter (503) has been determined.

Keeping with FIG. 5, the determined unknown parameters (506) may be used in the physical system model (300), for example, one of the physical system models (300) of FIG. 3. For clarity, a physical system model (300) which uses the determined unknown parameters (406) is referred to as a determined physical system model (508). The determined physical system model (508) possesses all the parameters necessary to model the dynamic system. The first signal (114) and the offset angle φ (116) between the first location and the second location are used with the determined physical model (508) to generate the virtual signal (112). The offset angle φ (116) may be chosen by a user, effectively placing the virtual probe (V) at any location on the machine (100) along the same cross-sectional plane as the first probe (X).

Figure 6:
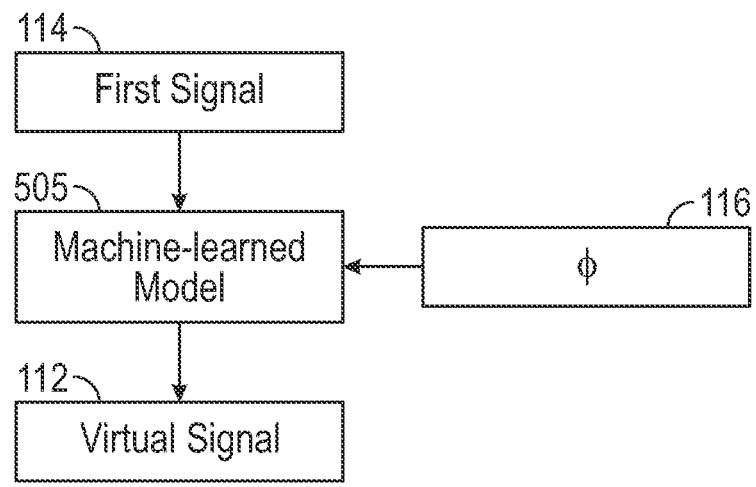
FIG. 6 depicts a process, in accordance with one or more embodiments.

In accordance with one or more embodiments, the machine-learned model (505) may generate a virtual signal (118) from a first signal (114) and offset angle φ (116) without referencing a physical system model (300). As shown in FIG. 6, the machine-learned model (505) may be configured to directly accept a first signal (114). The first signal (114) comes from a physical probe on a machine (100) of interest and has a known location. The machine-learned model (404) outputs the virtual signal (118) from a virtual probe (V) such that a second physical probe is not required on the machine (100). The location of the virtual probe (V) on the machine of interest is dictated relative to the location of the physical probe and is defined by the offset angle φ (116). In some embodiments, the offset angle φ (116) is an input of the machine-learned model (404) as shown in FIG. 6, whereas in other embodiments the offset angle φ (116) is a configuration parameter of the machine-learned model (505).

Regardless of whether the machine-learned model (505) references a physical system model (300) or not, the machine-learned model (505) will need to be trained. Training a machine-learned model (505), generally, consists of providing the model with training data, wherein the training data contains both the planned input to the model and associated expected output of the model. For example, in accordance with one or more embodiments, the training data may be received from one or more machines (100) equipped with at least two vibration probes (108). The input may consist of a first signal (114) from a first probe (X) and an angle θ dictating the angular offset of a second probe (Y) from the first probe (X). The output data consists of a second signal from the second probe (Y) such that the desired output of the machine-learned model is the second signal given the first signal (114). In this example, the machine-learned model (505) may be trained to associate the second signal with the first signal (114) such that the second signal is no longer required. As such, the output of the machine-learned model (505) may be thought of as a virtual signal (112) since a second probe (Y) is not required to generate a second signal.

In some embodiments, training data is collected from vibration probes (108) on one or more machines (100) equipped with two or more vibration probes (108) angularly offset at various angles θ where the machines (100) may be subjected to known forces or forcing functions. The imposed forces or forcing functions may be designed, and/or generated, to mimic a wide variety of scenarios encountered with machine use, such as imbalance, misalignment, and rub. In this way, a robust set of training data may be collected so that the resulting trained machine-learned model (505) is readily applicable to many machine vibration scenarios.

In some embodiments, a physical system model (300) is used to describe a machine (100). The vibrational response of the machine (100) may be simulated by applying a variety of forcing functions, or forces, to the physical system model (300). The simulated vibrational response is representative of the signal that would be recorded by a vibration probe (108). Using the physical system model (300) and an applied forcing function or force, the signal of one or more vibration probes (108) (e.g. a first probe (X) and a second probe (Y)) may be simulated and recorded. In some embodiments, the first probe (X) may be a physical vibration probe (108) such that only the second probe (Y) signal needs to be simulated. The simulated vibrational responses of the probes may be used as training data to train a machine-learned model (505) to generate the response of one probe (e.g. the second probe (Y)) given the response of another probe (e.g. the first probe (X)). In some embodiments, a simulated signal may be validated using a physical vibration probe (108) or a physically-acquired signal may be used with a simulated signal. Training data may be generated for different physical system models (300) (e.g. different value for spring constants, etc.). A machine-learned model (505) should be trained using training data generated using a physical system model (300) that is representative of the machine (100) on which the machine-learned model (505) will be applied. Once trained, using training data from a physical system model representative of a machine (100), the machine-learned model (505) may be applied to the machine (100) with only a single vibration probe (108) to generate a second signal from a virtual probe (V).

More details surrounding training a machine-learned model (505) are provided below under the context of a neural network.

Figure 7:
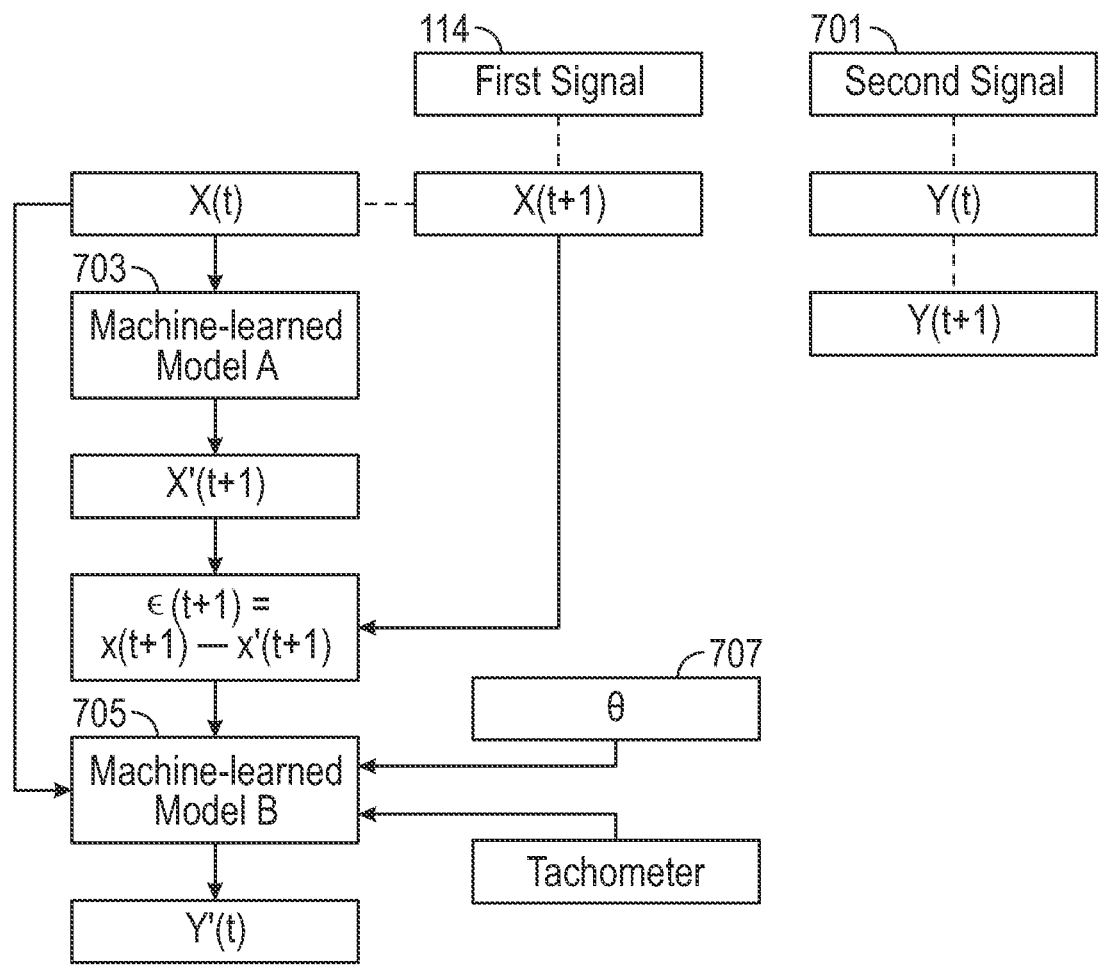
FIG. 7 depicts a process, in accordance with one or more embodiments.

In accordance with one or more embodiments, FIG. 7 depicts another method to collect training data and train a combination of machine-learned models. As seen in FIG. 7, training data is collected from one or more machines (100) with at least two vibration probes (108) and a speed sensor or tachometer. In some embodiments, a speed sensor or tachometer is not used. For the present example, a machine (100) is equipped with a first probe (X) and a second probe (Y). The first probe (X) outputs a first signal (114) and the second probe outputs a second signal (701). For clarity, FIG. 7 depicts the first signal (114) and second signal (701) as a time-series where the value of the signals at a given time t is given as X(t) and Y(t), respectively. In some embodiments, the time t may index a complete revolution (or cycle) (e.g. a rotating shaft (102)) such that X(t) and Y(t) represent a sequence of values (i.e. X(t) is the recorded signal for one cycle and X(t+1) is the recorded signal for the next cycle). A machine-learned model A (703) is trained using only the first signal (114). Machine-learned model A (703) is trained to predict the value of the first signal (114) at a time (t+1) given the value of the first signal (114) at time t. Once trained, machine-learned model A (703) produces a prediction for X(t+1) given an input of X(t). For clarity, the prediction of machine-learned model A (703) is designated as X'(t+1). The prediction of machine-learned model A (703) is compared to the actual value of the first signal (114) at each timestep (t+1) to compute an error, ε(t+1). A machine-learned model B (705) is trained to predict the value of the second signal (701) at a time t, Y(t). Again, for clarity, the prediction of machine-learned model B (705) is designated as Y'(t). During training, machine-learned model B (705) receives the value of the first signal (114) at time t, X(t), along with the error of machine-learned model A (703), ε(t+1), and the angular offset of the two vibration probes (108), θ(707), the value of the second signal (701) at a time t, Y(t), and, in some embodiments, the value of the tachometer. Thus, once trained, machine-learned model A (703) and machine-learned model B (705) may be used in coordination to output a signal for a virtual probe (V) using a first signal (114) from a first probe (X), a tachometer value (in some embodiments), and an indication of the angular offset between the virtual probe (V) and the first probe (X).

Figure 8:
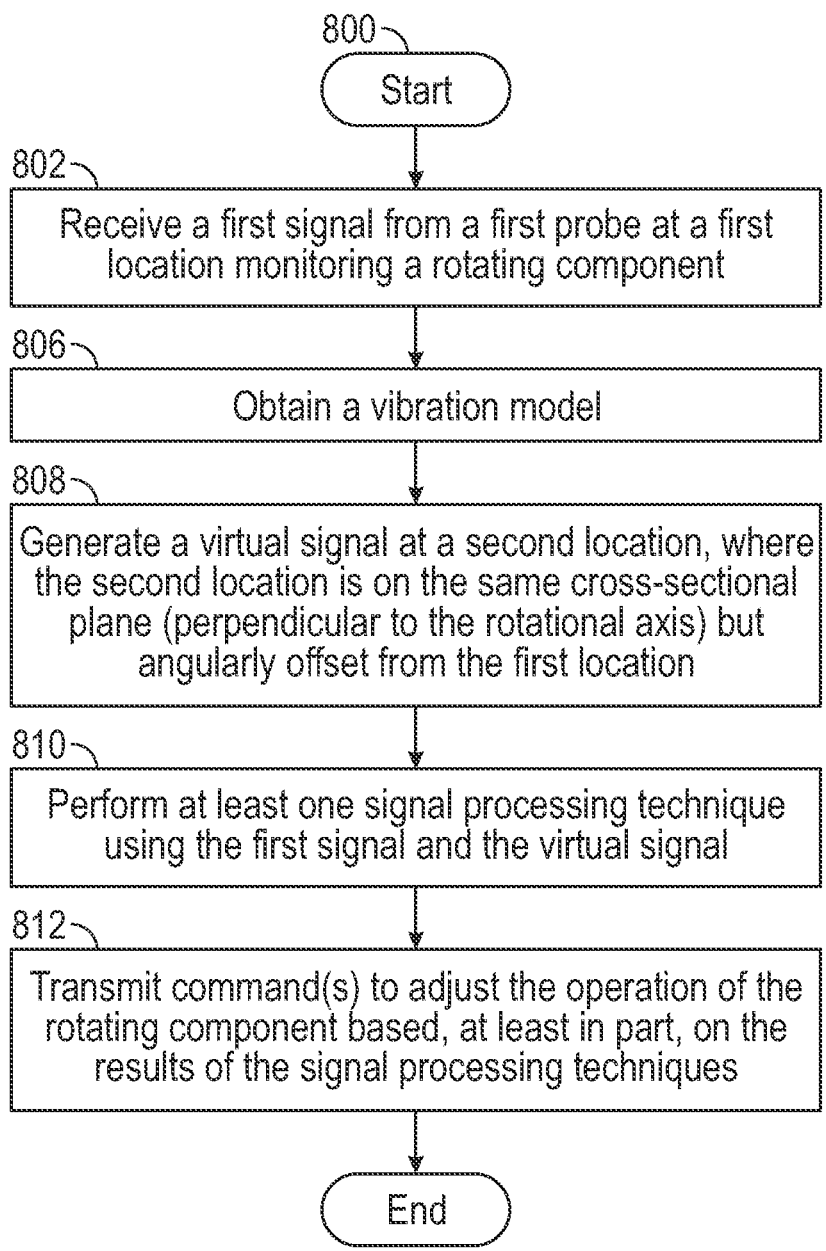
FIG. 8 depicts a flow chart, in accordance with one or more embodiments.

In accordance with one or more embodiments, FIG. 8 depicts a flow chart (800) outlining the general method of generating a virtual signal (V) monitoring a rotating component, where the rotating component may be part of a machine (100), performing signal processing techniques using the virtual signal (V), and adjusting the rotating component and/or machine (100) based on the results of the signal processing techniques. As shown in block 802 a first signal (114) from a first probe (X) at a first location is received. The first location lies in a cross-sectional plane where the cross-sectional plane is perpendicular to the axis of rotation of the rotating component. The first probe (X) is a physical probe. The first signal (114) is the time-history of the strength of vibrations, measuring either displacement (x), velocity (ẋ), or acceleration (ẍ) proximate the first location. As depicted in block 806, a vibration model (406) is obtained. The vibration model (406) may be a machine-learned model (505) and the machine-learned model (505) may be informed or constrained by a physical system model (300). As shown in block 808, a virtual signal (112) is generated at a second location. The second location is located in the same cross-sectional plane as the first location but angularly offset from the first location. As described in block 810, signal processing techniques may be applied to the first signal (114) and the virtual signal (112). It is emphasized that signal processing techniques that require at least two vibration probe (108) signals (112, 114) may be performed. Because the signal processing techniques are not limited to those that work on a single vibration probe (108) signal, more information regarding the state, condition, and health of the rotating component and/or machine (100) may be extracted. The signal processing techniques may determine quantities such as shaft vibration phase angle, shaft orbit plot and wave form, shaft centerline location, vibration frequency spectrum for horizontal and vertical locations of vibrations, etc. More specifically, for example, an orbit plot (202) may be created using signal processing techniques when the rotating component is a shaft (102). The orbit plot (202) may be evaluated to detect excessive shaft (102) movement and indicate when a shaft (102) may contact and damage other components of the machine (100). Moreover, the orbit plot (202) may be evaluated to detect perturbations or malfunctions in the machine (100). As shown in block 812, using the results of the signal processing techniques, commands regarding adjustments to be made to the rotating component and/or machine are transmitted. Based on the condition and state of the machine (100), an appropriate action may be taken. Actions that may be taken on a rotating component and/or a machine (100) include, but are not limited to: no adjustment required; shutting down the operation of the component and/or machine (100); replacing the rotating component and/or machine (100); repairing the rotating component and/or machine (100); and performing maintenance operation on the rotating component and/or the machine (100).

As an example, consider an air compressor equipped with only a single vibration probe (108). A single signal from a single probe does not provide sufficient information to predict failures in advance, but rather a single probe can only provide a late indication of major damage to/within the air compressor. As such, it is not possible to plan, or otherwise decide on, an action to take on such a machine. Using the techniques of the present disclosure, a virtual signal may be generated, and two-signal vibration analyses may be applied. These two-signal vibration analyses can detect vibration signatures known to be associated with machine issues, or burgeoning machine issues, such as internal misalignments, and poor bearing lubrication. With an issue detected, an operator may take an action, such as scheduling a repair, before any damage to a machine becomes irreversible or irreparable.

While the various blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Embodiments of the present disclosure may provide at least one of the following advantages. It is noted that because the vibration probes (108) have associated locations, evaluation of the results of signal processing techniques may further specify the location of failure or anomaly in a machine (100). By identifying, or predicting, the faulty component of a machine (100), the time required to diagnose and inspect a machine (100), and subsequently repair, maintain, or replace a machine (100) is reduced. Degradation of machine (100) performance may be identified early. Information regarding early performance degradation and prediction of failures may be used to prevent catastrophic failures; either by adjusting operating conditions or by taking an action on the machine. By preventing a catastrophic failure, the economically costly event of an unscheduled operating facility outage may be avoided. Additionally, embodiments of the present disclosure eliminate human errors in diagnosing issues within a machine (100).

Figure 9:
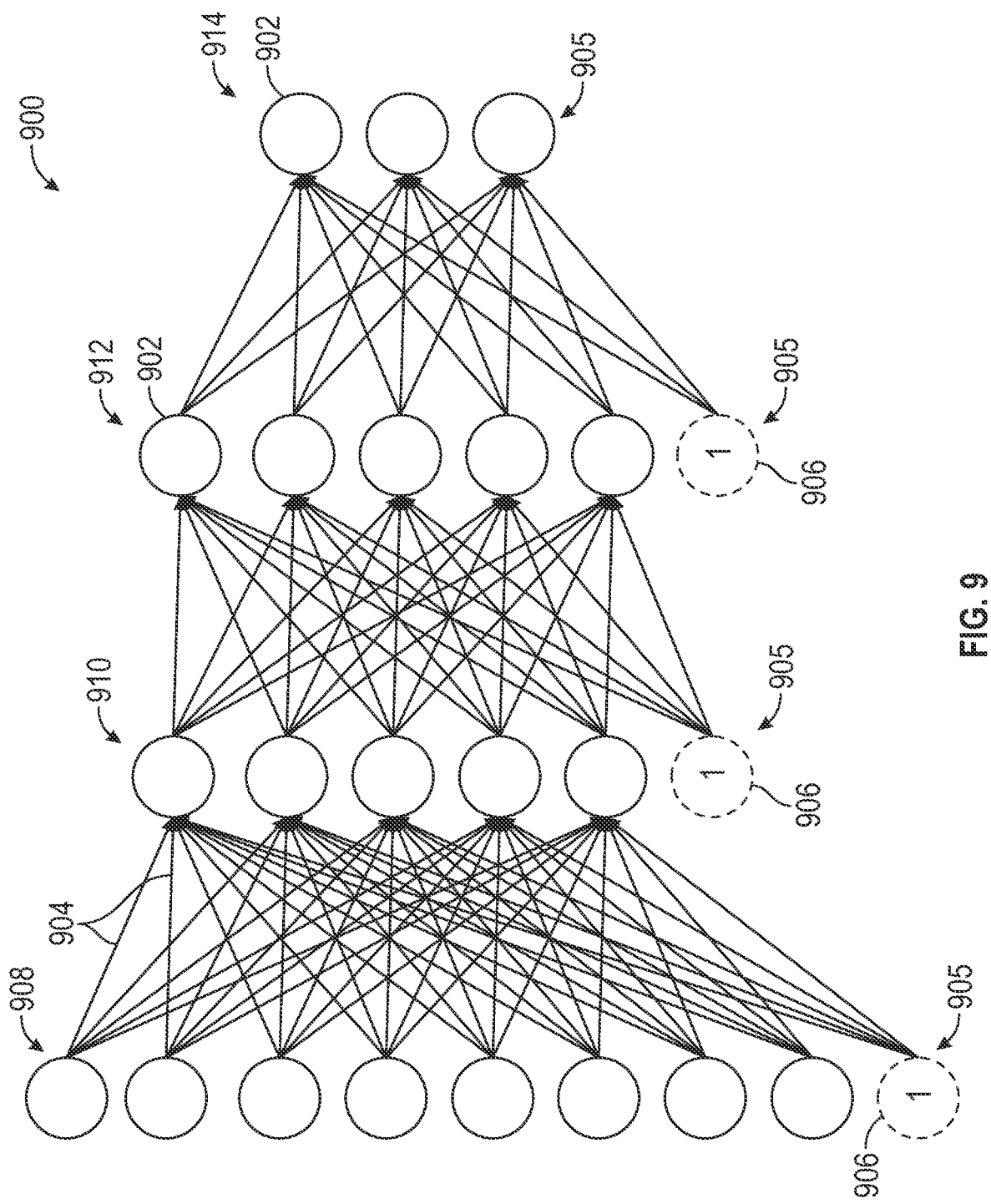
FIG. 9 depicts a neural network, in accordance with one or more embodiments.

As stated, many machine-learned model (505) types are available. In accordance with one or more embodiments, the selected machine-learned model (505) type is a neural network. A diagram of a neural network is shown in FIG. 9. At a high level, a neural network (900) may be graphically depicted as being composed of nodes (902), where here any circle represents a node, and edges (904), shown here as directed lines. The nodes (902) may be grouped to form layers (905). FIG. 9 displays four layers (908, 910, 912, 914) of nodes (902) where the nodes (902) are grouped into columns, however, the grouping need not be as shown in FIG. 9. The edges (904) connect the nodes (902). Edges (904) may connect, or not connect, to any node(s) (902) regardless of which layer (905) the node(s) (902) is in. That is, the nodes (902) may be sparsely and residually connected. A neural network (900) will have at least two layers (905), where the first layer (908) is considered the "input layer" and the last layer (914) is the "output layer". Any intermediate layer (910, 912) is usually described as a "hidden layer". A neural network (900) may have zero or more hidden layers (910, 912) and a neural network (900) with at least one hidden layer (910, 912) may be described as a "deep" neural network or as a "deep learning method".

In general, a neural network (900) may have more than one node (902) in the output layer (914). In this case the neural network (900) may be referred to as a "multi-target" or "multi-output" network.

Nodes (902) and edges (904) carry additional associations. Namely, every edge is associated with a numerical value. The edge numerical values, or even the edges (904) themselves, are often referred to as "weights" or "parameters". While training a neural network (900), numerical values are assigned to each edge (904). Additionally, every node (902) is associated with a numerical variable and an activation function. Activation functions are not limited to any functional class, but traditionally follow the form $$A = f(\Sigma_{i \in (incoming)}[(\text{node value})_i (\text{edge value})_i]),$$

where i is an index that spans the set of "incoming" nodes (902) and edges (904) and $f$ is a user-defined function. Incoming nodes (902) are those that, when viewed as a graph (as in FIG. 9), have directed arrows that point to the node (902) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (902) in a neural network (900) may have a different associated activation function. Often, as a shorthand, activation functions are described by the function $f$ by which it is composed. That is, an activation function composed of a linear function $f$ may simply be referred to as a linear activation function without undue ambiguity.

When the neural network (900) receives an input, the input is propagated through the network according to the activation functions and incoming node (902) values and edge (904) values to compute a value for each node (902). That is, the numerical value for each node (902) may change for each received input. Occasionally, nodes (902) are assigned fixed numerical values, such as the value of 1, that are not affected by the input or altered according to edge (904) values and activation functions. Fixed nodes (902) are often referred to as "biases" or "bias nodes" (906), displayed in FIG. 9 with a dashed circle.

In some implementations, the neural network (900) may contain specialized layers (905), such as a normalization layer, or additional connection procedures, like concatenation. One skilled in the art will appreciate that these alterations do not exceed the scope of this disclosure.

As noted, the training procedure for the neural network (900) comprises assigning values to the edges (904). To begin training the edges (904) are assigned initial values. These values may be assigned randomly, assigned according to a prescribed distribution, assigned manually, or by some other assignment mechanism. Once edge (904) values have been initialized, the neural network (900) may act as a function, such that it may receive inputs and produce an output. As such, at least one input is propagated through the neural network (900) to produce an output. Recall, that a given data set will be composed of inputs and associated target(s), where the target(s) represent the "ground truth", or the otherwise desired output. The neural network (900) output is compared to the associated input data target(s). The comparison of the neural network (900) output to the target(s) is typically performed by a so-called "loss function"; although other names for this comparison function such as "error function", "misfit function", and "cost function" are commonly employed. Many types of loss functions are available, such as the mean-squared-error function, however, the general characteristic of a loss function is that the loss function provides a numerical evaluation of the similarity between the neural network (900) output and the associated target(s). The loss function may also be constructed to impose additional constraints on the values assumed by the edges (904), for example, by adding a penalty term, which may be physics-based, or a regularization term. For example, the neural network (900), or more generally a machine-learned model (505), may quantify and use violations of a physical system model (300) to regularize the model during training. Such a process is often referred to as "physics-informed machine learning" or a "physics-informed neural network" (PINN) in the literature. Generally, the goal of a training procedure is to alter the edge (904) values to promote similarity between the neural network (900) output and associated target(s) over the data set. Thus, the loss function is used to guide changes made to the edge (904) values, typically through a process called "backpropagation".

While a full review of the backpropagation process exceeds the scope of this disclosure, a brief summary is provided. Backpropagation consists of computing the gradient of the loss function over the edge (904) values. The gradient indicates the direction of change in the edge (904) values that results in the greatest change to the loss function. Because the gradient is local to the current edge (904) values, the edge (904) values are typically updated by a "step" in the direction indicated by the gradient. The step size is often referred to as the "learning rate" and need not remain fixed during the training process. Additionally, the step size and direction may be informed by previously seen edge (904) values or previously computed gradients. Such methods for determining the step direction are usually referred to as "momentum" based methods.

Once the edge (904) values have been updated, or altered from their initial values, through a backpropagation step, the neural network (900) will likely produce different outputs. Thus, the procedure of propagating at least one input through the neural network (900), comparing the neural network (900) output with the associated target(s) with a loss function, computing the gradient of the loss function with respect to the edge (904) values, and updating the edge (904) values with a step guided by the gradient, is repeated until a termination criterion is reached. Common termination criteria are: reaching a fixed number of edge (904) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (904) values are no longer intended to be altered, the neural network (900) is said to be "trained".

Figure 10:
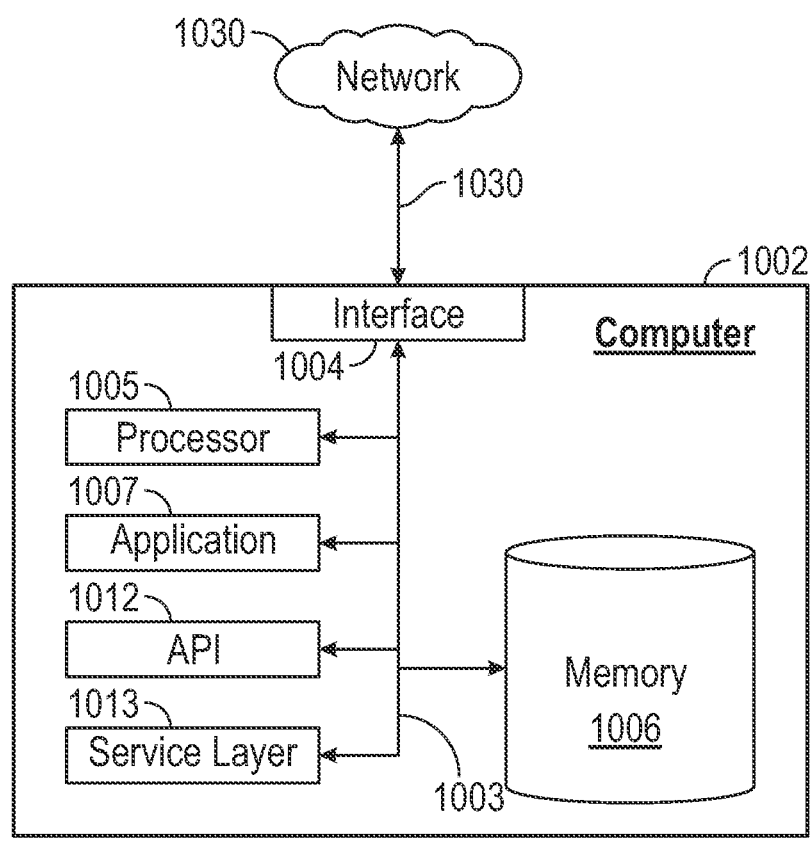
FIG. 10 depicts a system, in accordance with one or more embodiments.

FIG. 10 further depicts a block diagram of a computer system (1002) used to provide computational functionalities associated with the algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). The memory may be a non-transitory computer readable medium. For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
receiving a first signal from a first probe at a first location monitoring a rotating component, wherein the first location lies in a cross-sectional plane that is perpendicular to an axis of rotation of the rotating component;
obtaining a vibration model;
generating, by a computer processor, a virtual signal at a second location using the vibration model, wherein the second location lies in the cross-sectional plane and the second location is angularly offset by an angle from the first location;
performing a plurality of signal processing techniques based, at least in part, on the first signal and the virtual signal; and
transmitting a plurality of commands to adjust an operation of the rotating component based, at least in part, on results of the plurality of signal processing techniques.

2. The method of claim 1, wherein the rotating component is part of a machine.

3. The method of claim 2, further comprising:
evaluating the machine based, at least in part, on results of the plurality of signal processing techniques; and
performing one or more actions on the machine based on evaluation of the machine.

4. The method of claim 3, wherein the one or more actions comprise repairing the machine.

5. The method of claim 1, further comprising pre-processing, by the computer processor, the first signal.

6. The method of claim 1, wherein the vibration model comprises a machine-learned model.

7. The method of claim 6, wherein the machine-learned model is trained using a third signal and a fourth signal, wherein the third signal is obtained by a physical probe monitoring a machine while being subjected to a variety of forcing functions and the fourth signal is generated using a physical system model describing the machine and the third signal.

8. The method of claim 6, wherein the machine-learned model is trained using a fifth signal and a sixth signal, wherein the fifth and sixth signals are obtained using physical probes monitoring a machine with rotating equipment, wherein the physical probes are located on a second cross-sectional plane which is perpendicular to the axis of rotation of the machine and the physical probes are separated by an offset angle.

9. The method of claim 1, wherein the plurality of signal processing techniques comprises creating an orbit plot.

10. A non-transitory computer readable medium storing instructions executable by a computer processor, the instructions comprising functionality for:
receiving a first signal from a first probe at a first location monitoring a rotating component, wherein the first location lies in a cross-sectional plane that is perpendicular to an axis of rotation of the rotating component;
obtaining a vibration model;
generating a virtual signal at a second location using the vibration model, wherein the second location lies in the cross-sectional plane and the second location is angularly offset by an angle from the first location;
performing a plurality of signal processing techniques based, at least in part, on the first signal and the virtual signal; and
transmitting a plurality of commands to adjust an operation of the rotating component based, at least in part, on results of the plurality of signal processing techniques.

11. The non-transitory computer readable medium of claim 10,
wherein the rotating component is part of a machine.

12. The non-transitory computer readable medium of claim 11, further comprising instructions for:
evaluating the machine based, at least in part, on results of the plurality of signal processing techniques; and
determining one or more actions to be performed on the machine based on evaluation of the machine.

13. The non-transitory computer readable medium of claim 10, further comprising instructions for pre-processing the first signal.

14. The non-transitory computer readable medium of claim 10, wherein the vibration model comprises a machine-learned model.

15. The non-transitory computer readable medium of claim 14, wherein the machine-learned model is trained using a third signal and a fourth signal, wherein the third signal is obtained by a physical probe monitoring a machine while being subjected to a variety of forcing functions and the fourth signal is generated using a physical system model describing the machine and the third signal.

16. The non-transitory computer readable medium of claim 14, wherein the machine-learned model is trained using a fifth signal and a sixth signal, wherein the fifth and sixth signals are obtained using physical probes monitoring a machine with rotating equipment, wherein the physical probes are located on a second cross-sectional plane which is perpendicular to the axis of rotation of the machine and the physical probes are separated by an offset angle.

17. A system, comprising:
a machine;
a first vibration probe at a first location disposed to monitor, at least, a component of the machine, wherein the component of the machine rotates about an axis of rotation, and wherein the first location defines a cross-sectional plane perpendicular to the axis of rotation;
a vibration model; and
a computer communicably connected to the first vibration probe and comprises:
one or more computer processors, and
a non-transitory computer readable medium storing instructions executable by a computer processor, the instructions comprising functionality for:
receiving a first signal from the first vibration probe;
generating a virtual signal at a second location on the machine using the vibration model, wherein the second location lies in the cross-sectional plane defined by the first location and is angularly offset by an angle from the first location;
performing a plurality of signal processing techniques based, at least in part, on the first signal and the virtual signal; and
transmitting a plurality of commands to adjust the machine based, at least in part, on results of the plurality of signal processing techniques.

18. The system of claim 17, further comprising instructions for:
pre-processing the first signal,
evaluating the machine based, at least in part, on results of the plurality of signal processing techniques; and
determining one or more to be performed actions on the machine based on evaluation of the machine.

19. The system of claim 18, wherein the one or more actions comprise repairing the machine.

20. The system of claim 17, wherein the vibration model comprises a machine-learned model.

* * * * *